(12) United States Patent
Enders

(10) Patent No.: US 7,552,519 B2
(45) Date of Patent: Jun. 30, 2009

(54) AIRBAG MODULE ATTACHMENT

(75) Inventor: Mark L. Enders, Pleasant View, UT (US)

(73) Assignee: Autoliv ASP, Inc., Ogden, UT (US)

(*) Notice: Subject to any disclaimer, the term of this patent is extended or adjusted under 35 U.S.C. 154(b) by 277 days.

(21) Appl. No.: 11/391,597

(22) Filed: Mar. 28, 2006

(65) Prior Publication Data
US 2007/0228698 A1 Oct. 4, 2007

(51) Int. Cl.
*B60R 21/16* (2006.01)
(52) U.S. Cl. ....................................... 28/728.2
(58) Field of Classification Search ............. 280/728.2, 280/730.1, 732, 731, 752
See application file for complete search history.

(56) References Cited

U.S. PATENT DOCUMENTS

| 4,709,943 | A | * | 12/1987 | Yoshimura et al. | 280/751 |
| 6,276,740 | B1 | * | 8/2001 | Mellor et al. | 296/72 |
| 6,675,675 | B1 | * | 1/2004 | Sauer et al. | 74/552 |
| 2004/0037629 | A1 | * | 2/2004 | Mikolajewski | 403/279 |
| 2007/0007752 | A1 | * | 1/2007 | Rose et al. | 280/728.2 |
| 2007/0252369 | A1 | * | 11/2007 | Thomas | 280/740 |

FOREIGN PATENT DOCUMENTS

DE 197 25 684 6/1997

* cited by examiner

Primary Examiner—Faye M. Fleming
(74) Attorney, Agent, or Firm—Sally J Brown; Stoel Rives LLP

(57) ABSTRACT

An airbag assembly and attachment mechanism is disclosed. According to one embodiment, the airbag assembly may include a snap attachment or catch mechanism to couple the airbag module to an instrument panel without the aid of fasteners. The catch mechanism may utilize a spring wire clip that is engaged by brackets extending from both the instrument panel and the airbag module housing.

8 Claims, 4 Drawing Sheets

AIRBAG MODULE ATTACHMENT

TECHNICAL FIELD

The present disclosure relates generally to the field of automotive protective systems. More specifically, the present disclosure relates to knee, side and passenger airbag assemblies and attachment mechanisms for knee, side and passenger airbag modules.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the scope of the present disclosure, the embodiments will be described and explained with specificity and detail in reference to the accompanying drawings in which:

FIG. 1A is a partially cut-away cross sectional view of a compression dampener of the airbag module of FIG. 1 along the plane 1A-1A;

FIG. 1B is a partially cut-away cross sectional view of an alternative embodiment of a compression dampener of the airbag module;

FIG. 2A is a side elevation view of an alternative embodiment of an airbag module coupled to the cross car beam;

DETAILED DESCRIPTION OF PREFERRED EMBODIMENTS

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other.

Figure 1:
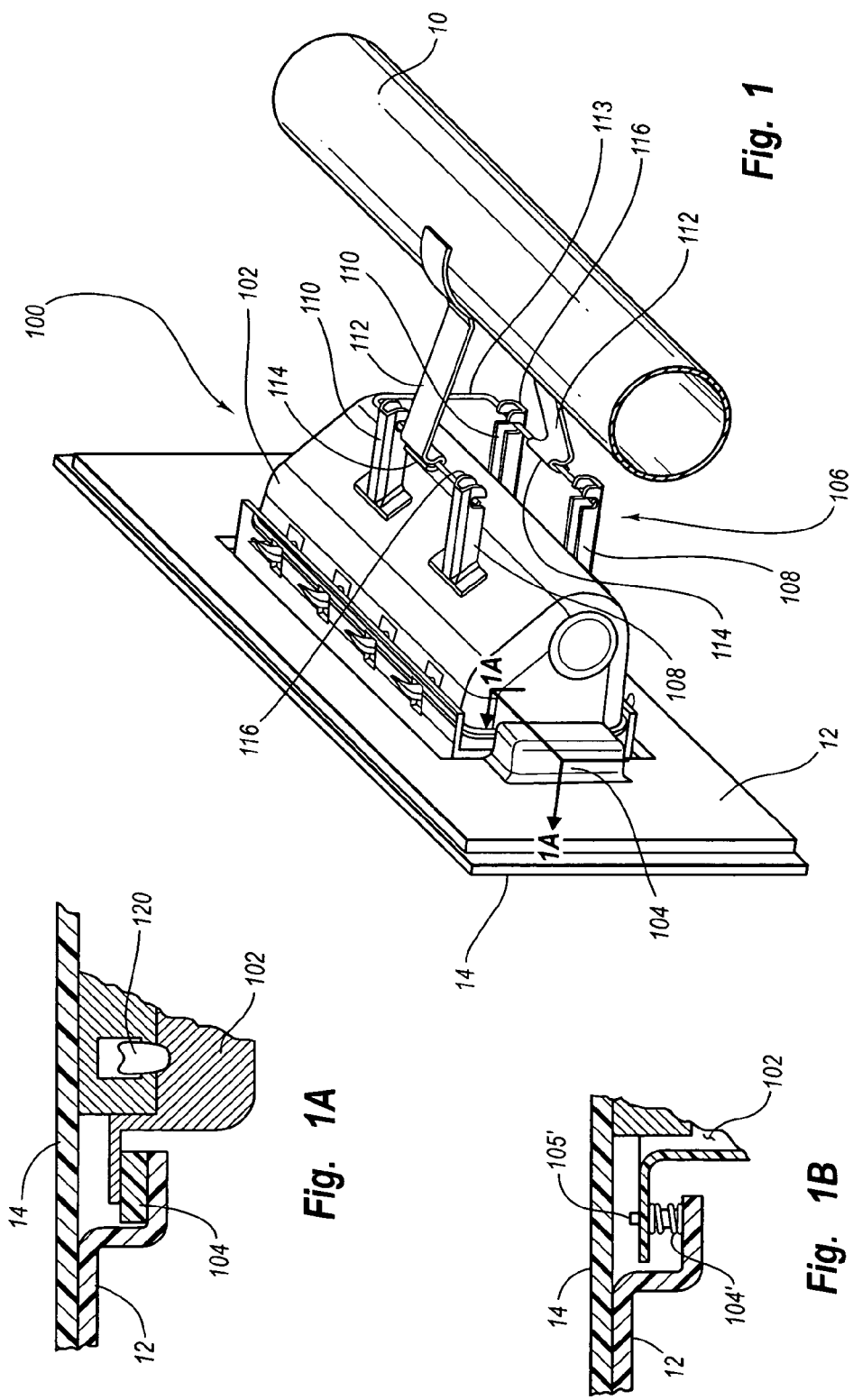
FIG. 1 is a perspective view of one embodiment of an airbag module coupled to a cross car beam within a vehicle.

FIG. 1 represents one embodiment of an airbag module 100, such as a knee airbag module, coupled to a cross car beam 10 within an instrument panel 12 of a vehicle, as shown from a perspective view. Alternatively, the airbag module 100 may be a side airbag module coupled to a rigid structural member 10 within a vehicle door, or a passenger side airbag module disposed in the instrument panel 12. In knee airbag applications, when a vehicle is involved in a collision event, particularly during a front end collision, there is a tendency for an occupant, such as one who is not properly restrained by a seat belt, to slide forward along the seat and "submarine" under the primary airbag. When the occupant submarines, the primary airbag is less effective in protecting the occupant. Such submarining may cause the vehicle occupant's knees to contact the instrument panel 12 or structure beneath the panel 12.

In order to prevent contact between an occupant's knees and the instrument panel 12, inflatable knee airbag systems and modules 100 have been developed to engage an occupant's knees or lower legs and prevent submarining under the primary airbag. Knee airbag modules 100 may be positioned in the lower portion of the instrument panel 12. Typical knee airbag modules 100 include a reaction surface 102, a knee airbag cushion (not shown in FIG. 1), and inflator (not shown in FIG. 1). The inflator, once triggered, uses compressed gas, solid fuel, or a combination thereof to produce rapidly expanding gas to inflate the airbag. According to some embodiments, the inflated knee airbag occupies a generally rectangular volume of the vehicle leg compartment.

In one embodiment, the reaction surface is an airbag module housing 102. However, in alternative embodiments the reaction surface may be a plate or similar structure. The reaction surface 102 may provide a rigid, mostly non-movable surface to aid in pushing the inflating airbag into the correct position for protecting the vehicular occupant.

The airbag module housing 102 of FIG. 1 encloses at least a portion of the knee airbag as well as a portion of the airbag inflator. According to one embodiment, the module housing 102 is constructed of an engineering plastic. The module housing 102 may fit within a correspondingly sized compartment or cavity within the instrument panel 12. A cover 14 may conceal the knee airbag module compartment within the instrument panel 12. The cover 14 may include tear seams or similar structures as would be apparent to those having skill in the art, so as not to impede deployment of the knee airbag.

The position of the cover 14 relative to the exterior features on the instrument panel 12 may be controlled through the use of a pin and hole design (not shown in FIG. 1). The pin may be located on the cover 14 and the hole may be located in the instrument panel 12. Pin and hole assemblies may be designed as a plastic snap as known to those having skill in the art of design injection molded plastic components.

The airbag module 100 may further include a compression dampener 104 to reduce the advent of rattling under vibration loading of the airbag module 100. As shown in FIG. 1A, according to one embodiment, the compression dampener 104 is constructed of a compressible rubber material. Alternatively, as shown in FIG. 1B, the compression dampener may comprise a spring 104' held in place by a pin 105'. The spring 104' may be compressible between the instrument panel 12 and the module housing 102. Alternative compression dampeners may be constructed of an alternative elastomeric material, foam or other material capable of compressing and storing energy.

According to the embodiment of the knee airbag module 100 shown in FIG. 1, a catch mechanism 106 may be used to couple the knee airbag module 100 to the cross car beam 10 of the instrument panel 12 without the aid of fasteners. The cross car beam 10 is a beam member that may be tubular as depicted. However, the term "beam" may also include L-brackets, channel brackets, such as a C-channel bracket, an I-beam or other rigid structural member disposed within the instrument panel 12 or door of the vehicle.

The instrument panel 12 is a rigid decorative and structural component of the vehicle. Various instrument and safety devices may be coupled to the instrument panel 12. The catch mechanism 106 may allow the airbag module 100 to snap into place within the instrument panel 12.

According to one embodiment, the catch mechanism 106 may include a first and a second pair of brackets or castanets, 108, 110 respectively, that extend from the airbag module 100 toward the cross car beam 10 of the instrument panel 12. A pair of brackets 112 may also extend from the cross car beam 10 toward the airbag module 100. The cross car beam brackets 112 may be affixed to the cross car beam 10 through spot welding. Alternatively, brackets 112 may be affixed to the cross car beam 10 through the use of fasteners and the like. Furthermore, brackets 112 may extend from an alternative structure within the instrument panel 12, such that brackets 112 are considered to extend from the instrument panel 12 toward the airbag module 100.

The catch mechanism 106 may further include a spring wire 113 that is secured to cantilevered ends 114 of the instrument panel brackets 112. The spring wire 113 may be a steel snap wire that may also be pre-tensioned in a direction tangentially away from the cross car beam 10. The spring wire 113 is deflectable in a direction against its pre-tensioning. In one embodiment the spring wire 113 is a U-shape. In another embodiment, the spring wire 113 is rectangular in shape. In yet another embodiment, the spring wire 113 is ring-shaped. Alternative shapes and structures would be apparent to those having skill in the art with the aid of the present disclosure.

The spring wire 113, held by brackets 112, may engage with first and second module brackets or castanets 108, 110 by being deflected by curved or ramped portions of the cantilevered ends 116 of brackets 108, 110. The spring wire 113 may be positioned such that it is configured to be engaged by brackets 108, 110.

Upon being deflected by brackets 108, 110, the spring wire 113 is maintained in recesses at cantilevered ends 116 of brackets 108, 110. According to one embodiment, the cantilevered ends 116 of brackets 108, 110 form hook structures to secure the spring wire 113 into the curved portion of the hook structure to maintain the snap securement of the airbag module 100 with the aid of compression dampener 104, 104', as shown in FIGS. 1A and 1B.

In some embodiments, the spring wire 113 may be removable from the hooks and/or recesses of the cantilevered ends 116 of brackets 108, 110 by squeezing the spring wire 113 in a direction away from its pre-tensioning. In alternative embodiments, once brackets 108, 110 snap into place with the spring wire 113, the snap connection is not easily removable.

In yet other alternative embodiments, the castanet brackets 108, 110 may instead extend from the cross car beam 10 of the instrument panel 12, while brackets 108 holding the spring wire 113 may extend from the airbag module housing 102 toward the cross car beam 10.

Figure 2:
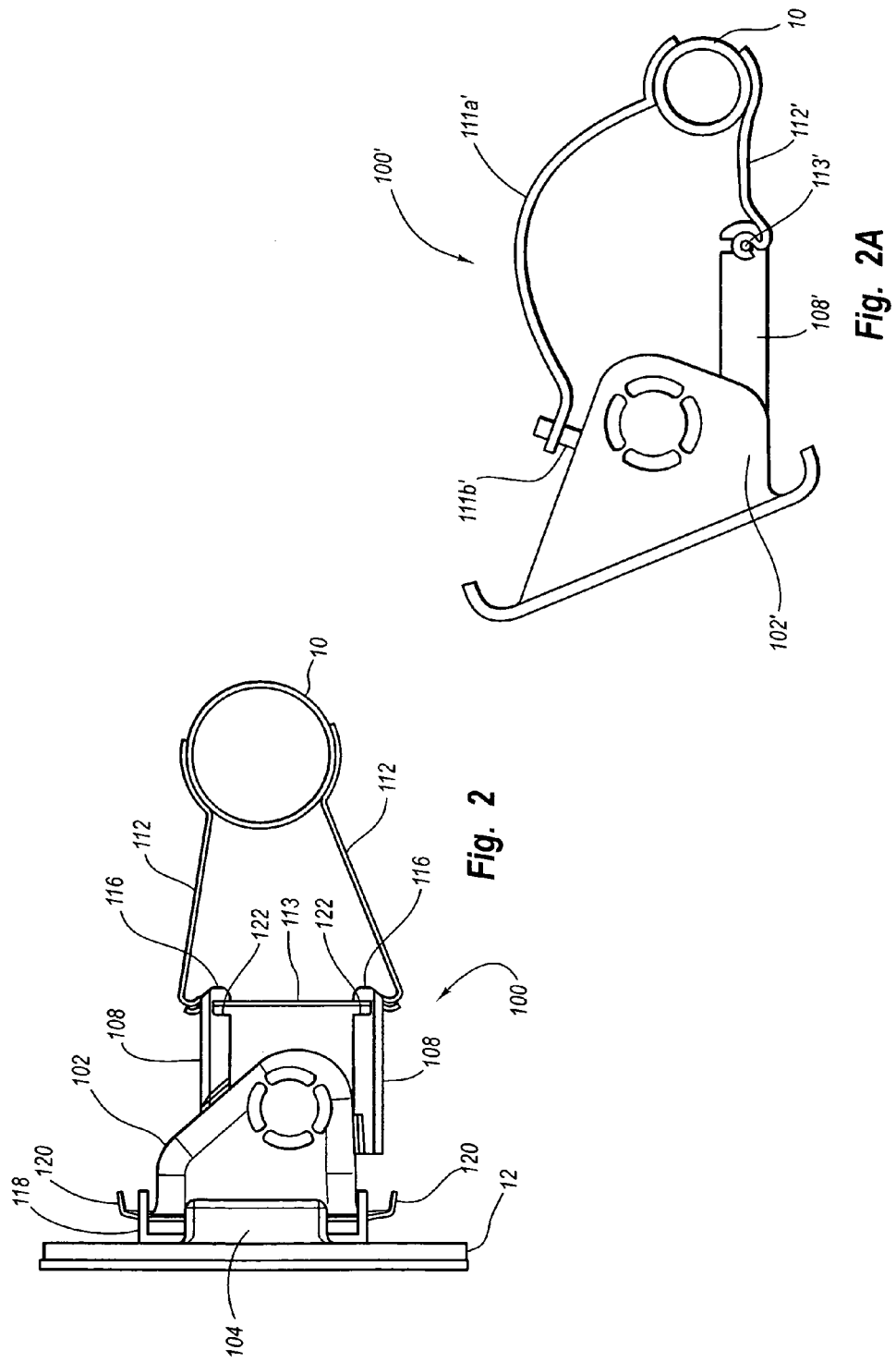
FIG. 2 is a side elevation view of the airbag module of FIG. 1 coupled to the cross car beam in a vehicle.

FIG. 2 represents the knee airbag module 100 of FIG. 1 as it is coupled to the instrument panel cross car beam 10, as shown from a side elevation view. Alternatively, FIG. 2 may also represent a side airbag module 100 as it is coupled to a rigid structural member 10 within the door of a vehicle. Moreover, the airbag module 100 may be a passenger side airbag module disposed within the instrument panel 12. As was discussed in FIG. 1 regarding the knee airbag module embodiment, the airbag module housing 102 fits within a compartment or cavity within the instrument panel 12, and may optionally be connected through attachment bracket 118. According to one method of attachment, protrusions 120 extending from the airbag module housing 102 engage corresponding indentations or orifices (visible in FIGS. 1 and 3).

The catch mechanism 106 of the knee airbag module 100 includes the spring wire 113, held by brackets 112. Castanet brackets 108 engage the spring wire 113 by deflecting the spring wire 113 against curved portions of the cantilevered ends 116 of brackets 108. The spring wire 113 engages brackets 108 by being maintained in recesses 122. The hook structure of the cantilevered ends 116 of brackets 108 maintain the spring wire 113 in a secured position.

FIG. 2A represents an alternative embodiment of an airbag module 100' coupled to a cross car beam 10 of an instrument panel. In this embodiment a single spring wire 113', held by bracket 112', may engage one or a pair of castanet brackets 108' that extend from the module housing 102' or reaction surface. An energy absorption bracket 111a' may interconnect the cross car beam 10 and the module housing 102' through an optional tongue and groove type module bracket 111b' connection. The energy absorption bracket 111a' may help in positioning the airbag module 100' in its proper orientation within the instrument panel.

Figure 3:
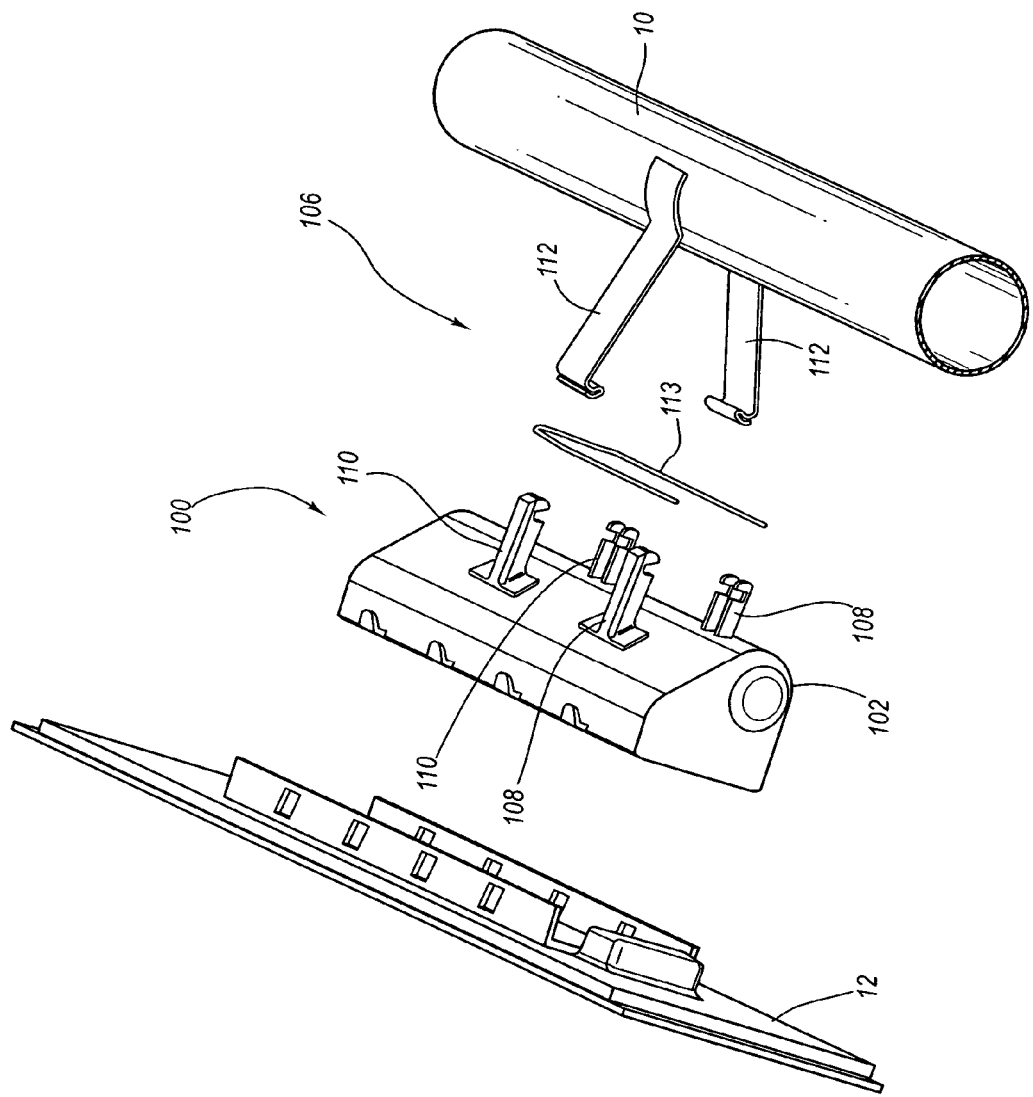
FIG. 3 is an exploded perspective view of the airbag module of FIG. 1.

FIG. 3 represents the knee airbag module 100 of FIG. 1 from an exploded perspective view. The knee airbag module 100 includes an airbag housing 102 and a catch mechanism 106 that couples the housing 102 to the cross car beam 10 within the instrument panel 12. The catch mechanism 106 comprises a first 108 and a second 110 pair of brackets that extend from the module housing 102, as well as a pair of brackets 112 that extend from the cross car beam 10. The brackets 108, 110, 112 engage a spring wire 113, such that brackets 108, 110 snap into place over the spring wire 113 when the airbag module 100 is positioned into the instrument panel 12.

Figure 4:
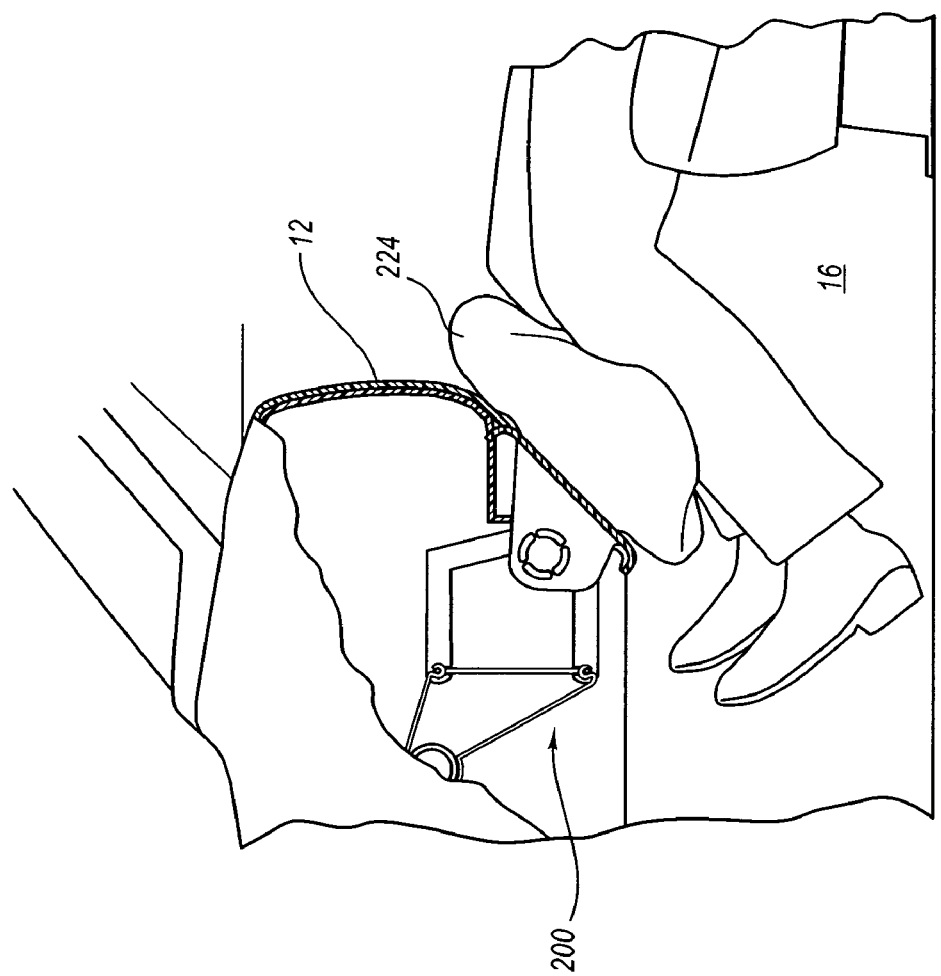
FIG. 4 is a side elevation view of a knee airbag deployed out of an instrument panel on the passenger side of a vehicle.

FIG. 4 represents a knee airbag 224 deployed from an airbag module 200 out of an instrument panel 12 on the passenger side of a vehicle 16, as shown from a side elevation view. In alternative embodiments, the airbag module 200 may be disposed in the driver side of the instrument panel 12. The knee airbag 224 is depicted in an inflated state proximate the bottom portion of the vehicle instrument panel 12.

The knee airbag cushions 224 may be constructed of fabric. Alternatively, the knee airbag 224 may be constructed of metal and/or plastic. Various alternative knee airbags 224 that may be used with the airbag module 200 disclosed would be apparent to those having skill in the art with the aid of the present disclosure. The knee airbag 224 typically deploys in an area that is likely to be engaged by an occupant's knees in a collision. The shape of the knee airbag 224 depicted is substantially wedge-shaped (as viewed from the perspective of the occupant), but alternatively could be elliptical, circular, rectangular, or another configuration.

The knee airbag module disclosed allows for the airbag module 200 to be snapped into the instrument panel 12 without the use of fasteners. This may provide a cost saving for original equipment manufacturers ("OEMs") during installation of the knee airbag module into the instrument panel 12.

The catch mechanisms, module housing brackets, instrument panel brackets and spring wires and clips disclosed herein are examples of means for coupling the airbag module housing to the instrument panel. Furthermore, the spring wires and clips disclosed herein are examples of spring means for deflecting into a secured position. Moreover, the module housing brackets and instrument panel brackets disclosed are examples of means for engaging the spring means.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. § 112 ¶6. The scope of the invention is therefore defined by the following claims.

The invention claimed is:

1. An airbag assembly, comprising:
an airbag module reaction surface configured to be coupled to a beam member within a vehicle; and
a catch mechanism to couple the airbag module reaction surface to the beam member, the catch mechanism comprising:
a spring wire that is configured to deflect into a secured position to secure the airbag module reaction surface to the beam member;
a first pair of brackets extending from the airbag module reaction surface; and
a pair of brackets extending from the beam member;
wherein the airbag module reaction surface brackets and the beam member brackets engage the spring wire.

2. The airbag assembly of claim 1, wherein the spring wire deflects against its pre-tensioning as the airbag module reaction surface is being coupled to the beam member.

3. The airbag assembly of claim 1, wherein the catch mechanism further comprises:
a second pair of brackets extending from the airbag module reaction surface to engage the spring wire.

4. The airbag assembly of claim 1, wherein the spring wire is secured to the beam member brackets and removably coupleable to the airbag module reaction surface brackets.

5. The airbag assembly of claim 1, wherein the airbag module reaction surface brackets include grooves to receive the spring wire.

6. The airbag assembly of claim 1, wherein the airbag module reaction surface brackets include hook structures to receive the spring wire.

7. The airbag assembly of claim 1, wherein the airbag module reaction surface brackets deflect the spring wire against the spring wire pre-tensioning as the airbag module reaction surface is coupled to the beam member.

8. The airbag assembly of claim 1, wherein the spring wire is secured to the airbag module reaction surface brackets and removably coupleable to the beam member brackets.

\* \* \* \* \*